(12) United States Patent
Wang et al.

(10) Patent No.: US 8,577,752 B2
(45) Date of Patent: *Nov. 5, 2013

(54) PHOTOBOOK ENGINE POWERED BY BLOG CONTENT

(71) Applicant: Shutterfly, Inc., Redwood City, CA (US)

(72) Inventors: Wiley H. Wang, Pacifica, CA (US); Craig Jorasch, Palo Alto, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/771,708

(22) Filed: Feb. 20, 2013

(65) Prior Publication Data

US 2013/0163009 A1 Jun. 27, 2013

Related U.S. Application Data

(63) Continuation-in-part of application No. 13/177,326, filed on Jul. 6, 2011, now Pat. No. 8,412,589.

(60) Provisional application No. 61/371,337, filed on Aug. 6, 2010.

(51) Int. Cl.
*G06Q 30/00* (2012.01)

(52) U.S. Cl.
USPC .......................................... 705/26.5; 705/27.1

(58) Field of Classification Search
USPC ................................................ 705/26.1–27.2
See application file for complete search history.

(56) References Cited

U.S. PATENT DOCUMENTS

| | | | |
|---|---|---|---|
| 2005/0177441 A1* | 8/2005 | Bryant | 705/26 |
| 2005/0289018 A1 | 12/2005 | Sullivan | |
| 2007/0239610 A1* | 10/2007 | Lemelson | 705/51 |
| 2011/0060437 A1* | 3/2011 | Durham et al. | 700/97 |

OTHER PUBLICATIONS

Carroll, J. (Apr. 16, 2001). Firms underestimate power of 'blogging'. The Globe and Mail.*

* cited by examiner

*Primary Examiner* — Resha Desai
(74) *Attorney, Agent, or Firm* — Xin Wen

(57) ABSTRACT

A computer system for creating a design for an image product includes servers that can identify a blog page that includes an image, text, or designs, automatically incorporate at least one of the image, text, or the design object in the blog page into the design of an image product, and allow a user to review the design of the image product. The servers communicate with a printing finishing facility that makes a physical image product according to the design of the image product.

20 Claims, 11 Drawing Sheets

PHOTOBOOK ENGINE POWERED BY BLOG CONTENT

The present application is a continuation-in-part application of and claims priority to pending U.S. patent application Ser. No. 13/177,326, titled "Photobook engine powered by blog content", filed on Jul. 6, 2011 by the same inventors. U.S. patent application Ser. No. 13/177,326 claims priority to U.S. Provisional Patent Application 61/371,337, titled "Photobook engine powered by blog content", filed on Aug. 6, 2010 by the same inventors. The disclosures of the above applications are incorporated herein by reference.

TECHNICAL FIELD

This application relates to utilization of digital images, and more specifically, to the design and creation of products incorporating digital images.

BACKGROUND OF THE INVENTION

In the last decade, photography has been rapidly transformed from chemical based technologies to digital imaging technologies. Images captured by digital cameras can be stored in computers and viewed on display devices. Users can also produce image products based on the digital images. Such products include photo books, photo calendars, photo greeting cards and stationeries, photo mug, photo T-shirt, image prints, and so on. A photo book typically includes a cover page and a plurality of pages containing images. Designing a photobook can include many iterative steps such as selecting suitable images, selecting layout, selecting images for each page, selecting backgrounds, picture frames, overall Style, add text, choose text font, and rearrange the pages, images and text, which can be quite time consuming.

It is desirable to provide methods to allow users to design and produce image products in a time efficient manner. In another aspect, it is also desirable to allow users to create image products using content from different sources.

SUMMARY OF THE INVENTION

The disclosed methods and systems provide ways to save users' time spent on creating image products such as photobooks. The disclosed methods and systems allow users to incorporate content from different sources into their image products. Specifically, users can conveniently incorporate own images, text, and designs from web blog pages, which allows image products to more effectively preserve users' memories.

In one general aspect, the present invention relates to a method for creating a design for an image product. The method includes identifying a blog page that includes an image, text, or designs by a computer system; automatically incorporating at least one of the image, text, or a design object in the blog page into the design of an image product by the computer system; and allowing a user to review the design of the image product, wherein the computer system is configured to communicate with a printing finishing facility at which a physical image product is to be made according to the design of the image product.

Implementations of the system may include one or more of the following. The step of automatically incorporating can include obtaining the number of views received by the blog page; and selecting the blog page based on the number of views. The method can further include enabling the user to publish the blog page by the computer system; and tracking the number of views received by the blog page by the computer system. The step of automatically incorporating can include obtaining the number of votes on the blog page, the image, the text, or the design object; and selecting, by the computer system, the blog page, or at least one of the image, text, or the design object on the blog page based on the number of votes. The method can further include enabling the user to publish the blog page by the computer system; and tracking the number of votes on the blog page by the computer system. The step of automatically incorporating can include determining the image formats of the image by the computer system; automatically selecting a page layout according to the image format of the image; and automatically incorporating the image into the page layout which forms a portion of the design of the image product. The step of automatically incorporating can include determining the image size of the image by the computer system; automatically selecting a page layout according to the image size of the image; and automatically incorporating the image into the page layout which forms a portion of the design of the image product. The method can further include enabling the user to publish the blog page by the computer system. The image product can include a photobook, a photo greeting card, or photo stationery. The blog page can be posted by the user. The method can further include receiving an order from the user for a physical image product; and making the physical image product according to the design of the image product at the printing finishing facility. At least one of the image, text, or the design object in the blog page can be transferred to the computer system via a computer network. The computer system can include one or more servers.

In another general aspect, the present invention relates to a computer system for creating a design for an image product. The system includes one or more servers that can identify a blog page that includes an image, text, or designs, automatically incorporate at least one of the image, text, or the design object in the blog page into the design of an image product, and allow a user to review the design of the image product. The one or more servers can communicate with a printing finishing facility that is configured to make a physical image product according to the design of the image product.

Implementations of the system may include one or more of the following. The one or more servers can obtain the number of views received by the blog page and select the blog page based on the number of views. The one or more servers can enable the user to publish the blog page and track the number of views received by the blog page. The one or more servers can obtain the number of votes on the blog page, the image, the text, or the design object and select the blog page, or at least one of the image, text, or the design object on the blog page based on the number of votes. The one or more servers can enable the user to publish the blog page and track the number of votes on the blog page. The one or more servers can determine the image formats of the image; automatically select a page layout according to the image format of the image; and automatically incorporate the image into the page layout which forms a portion of the design of the image product. The one or more servers can determine the image size of the image, automatically select a page layout according to the image size of the image, and automatically incorporate the image into the page layout which forms a portion of the design of the image product. The one or more servers can enable the user to publish the blog page. The image product can include a photobook, a photo greeting card, or photo stationery.

These and other aspects, their implementations and other features are described in detail in the drawings, the description and the claims.

DETAILED DESCRIPTION OF THE INVENTION

Figure 1:
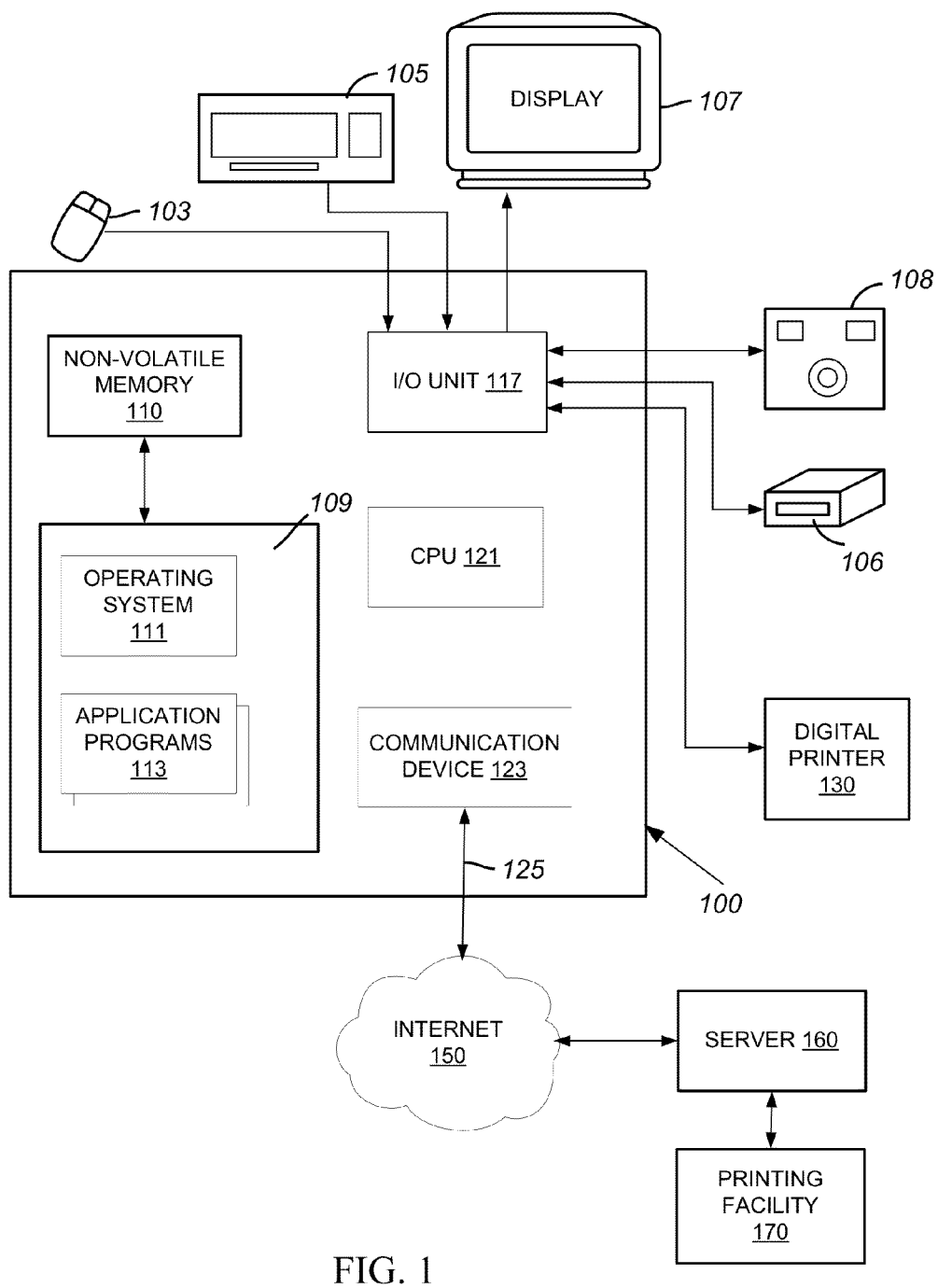
FIG. 1 is a block diagram of a computer network system compatible with the present invention.
Figure 2:
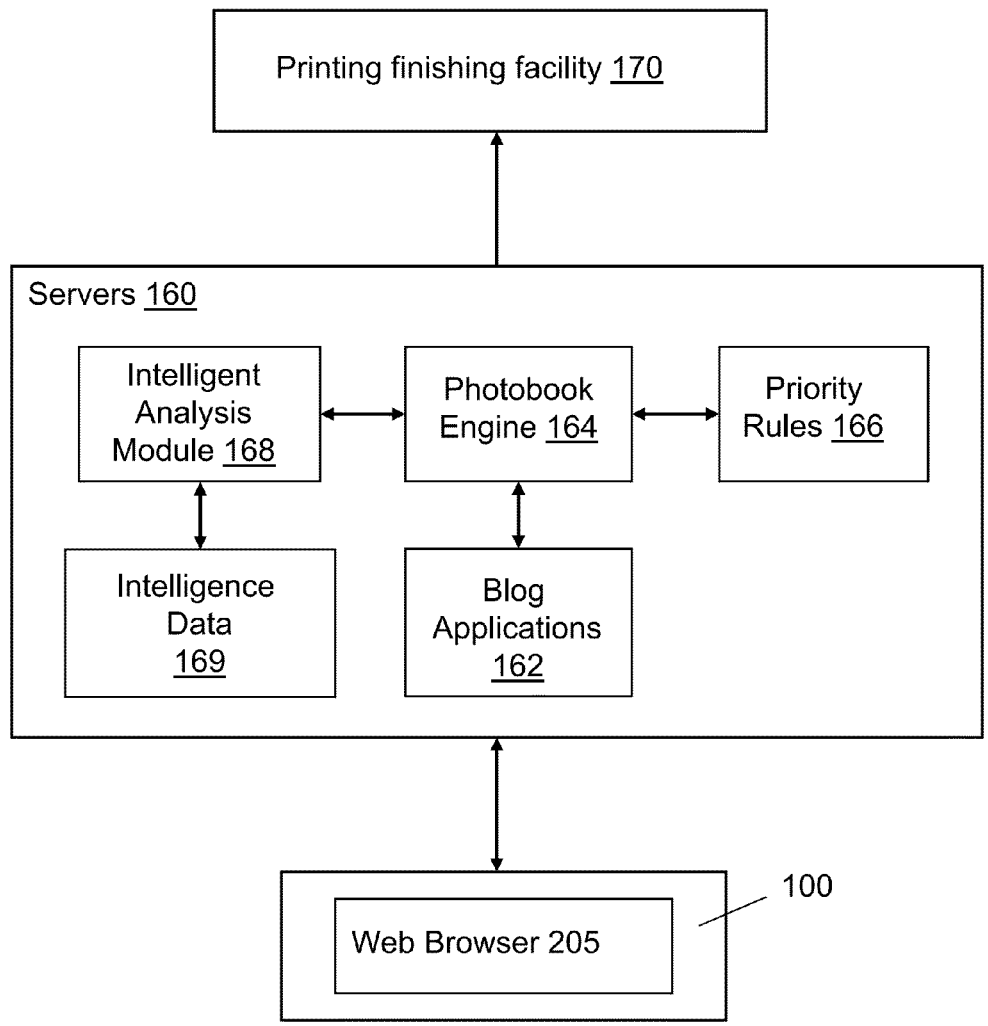
FIG. 2 shows details of the computer network system in FIG. 1.

Referring to FIGS. 1 and 2, a computer device 100 includes input/output (I/O) devices (e.g. mouse 103, keyboard 105, display 107), a central processor unit (CPU) 121, an I/O unit 117, and a memory 109 that stores data, an operating system 111, and application programs 113. The computer device 100 also includes non-volatile memory 110 and a communications device 123 for exchanging data with a network 127 via a communications link 125 such as a cable modem, DSL service or wireless Internet connection. The digital images captured by a digital camera 108 can be transferred to the non-volatile memory 110 via wired or wirelessly connections. The images can be uploaded from the computer device 100 to a server 160 via Internet 150. The computer device 100 can exist in different configurations such as a desktop computer, a laptop or tablet computer, a smart phone, etc. The computer device 100 can also include a network based system including servers, databases etc., which can provide service to remote users over a computer network such as the Internet.

Although large numbers of images are frequently captured by digital cameras, only a small fraction of the digital images are used in customized imaging products, which are available from image service providers such as Shutterfly, Inc. Customizable image products can include photobooks, photo calendars, photo greeting cards, photo stationeries, photo mugs, photo T-shirt, and so on, which can provide significant enhanced ways for preserving people's treasured memories in addition to viewing images on electronic displays.

Additionally, significant obstacles exist even for creating and obtaining customizable image products. The design of a photobook, for example, can take significant amount of time and effort. A user has to select images, often from thousands of image, for many pages including a cover page. The user needs to select a format (size and cover material) and a style for the photobook. The user needs to design or select layout and a background pattern for each page, sort images for different pages, and place images onto individual pages. The photobook design can take many iterative steps such as selecting suitable images, selecting layout, selecting images for each page, add text, which can often take hours to complete.

In the present invention, the term "photobook" refers to a book that includes multiple pages and at least one image on one of the pages, which may include photo book, photo scrapbook, photo calendars, etc. At least some of the pages include one or more images and text or image caption. The present invention concepts are also suitable for image products other than photobooks. The image products can include multiple pages (i.e. faces or views) that each can display one or more images, such as, photo greeting cards, holiday cards, multi-face photo cards, photo mugs, photo T-shirts, photo aprons, single photo pages, photo collage pages, photo stationery, photo banners, photo mugs, photo mouse pads, photo keychains, photo collectors, and photo coasters, etc.

The style and the format of the image product can have default selections. For example, a photobook can have "everyday" and hardcover book style, and 8" by 8" for the photobook format. In some embodiments, the style and the format of the photobook can be selected based on knowledge of the images in the group. Specifically, an image property can be extracted from the group of identified images. For example, if the images are identified by a common tag label "Hawaii Vacation", a photobook style for vacation, or specifically for Hawaiian vacation, may be automatically selected. In another example, if the images identified are in an electronic album called "Molly's Birthday Party", a birthday photobook style can be automatically selected.

Still referring to FIGS. 1 and 2, the servers 160 can host a website to allow users to view, edit, share, archive images. The servers 160 can include blog applications 162 that can enable a user to create, edit, update, and publish blog pages at the website. Different users can view the blog page using an application such as web browser 205 on a computer device 100 such as a lap top computer, a personal PC, or a smart phone (e.g. iPhone).

In accordance with the present invention, the servers 160 include a photobook engine 164 coupled with the blog applications 162. The content and designs on the blog pages are analyzed by an intelligent analysis module 168 and then selected are based on a set of priority rules 166 and predetermined criteria. The intelligent analysis module 168 can retrieve information from intelligence data 169 or store analysis results in the intelligence data 169. The photobook engine 164 can generate designs of photobooks using the selected content and designs on the blog pages. The servers 160 are in communication with a printing and finishing facility 170 which can manufacture image products such as photobooks based on the designs. The blog pages can be posted at a social network web site hosted by companies such as Shutterfly, Inc., Facebook, MySpace, Photobucket, Yahoo, and Google. The photobook design can be enabled by the photobook engine 164 at the same web site or a different website from the one in which the blog pages are posted.

Referring to FIGS. 2-4B, with the assistance of the blog applications 162, a user (i.e. the owner of the blog pages) can create blog pages 400, 405 at a web site and post one or more images 410 such as "Image A"-"Image F", text 420, and design objects 430 on the blog pages 400, 405.

Figure 3:
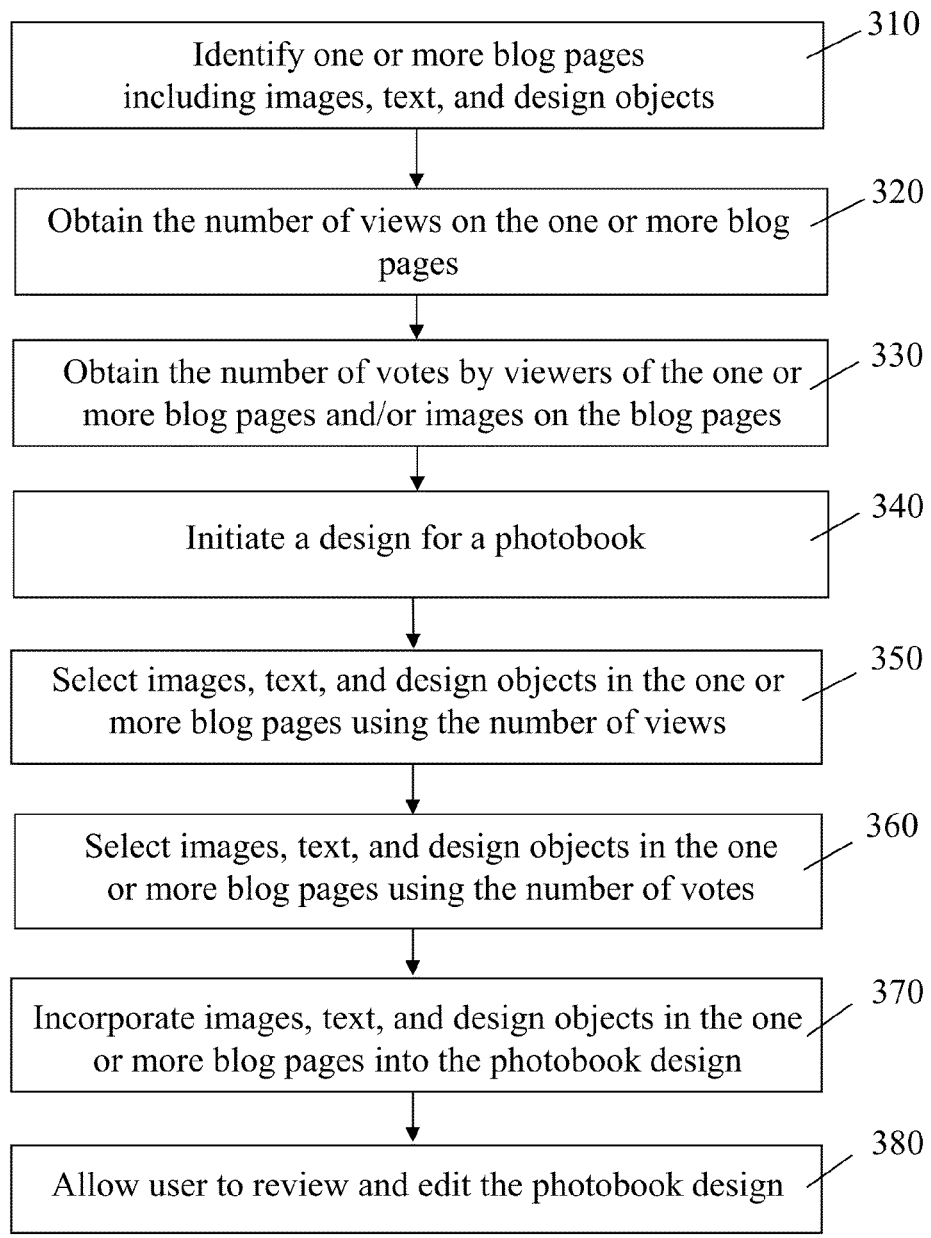
FIG. 3 shows a flow chart for creating a photobook based on the content of blog pages in accordance to the present invention.

The blog pages 400, 405 are identified and analyzed by the intelligent analysis module 168 (step 310, FIG. 3). The blog pages 400, 405 can be about a trip (e.g. a trip to Europe), a vacation, a baby, a graduation ceremony, wedding, sport games, a family reunion, etc. The blog pages 400, 405 can include comments 440 from viewers of the blog page. The text 420 can include description written by the owner of the blog pages, and comments from other users. The servers 160 (FIG. 2) can track the number of views 450 (or visits and click-throughs) that the blog page 400 or 405 or an image 410 has received. The number of views 450 is stored in the intelligence data 169 and analyzed by the intelligent analysis module 168 (step 320, FIG. 3). The web site can also tally the votes 460 (or likings, or favorites) by the viewers on the blog page 400 or 405, one or more images 410, the text 420, or the design objects 430. The number of votes 460 can be stored in the intelligence data 169 and analyzed by the intelligent analysis module 168 (step 330, FIG. 3).

Figure 5A:
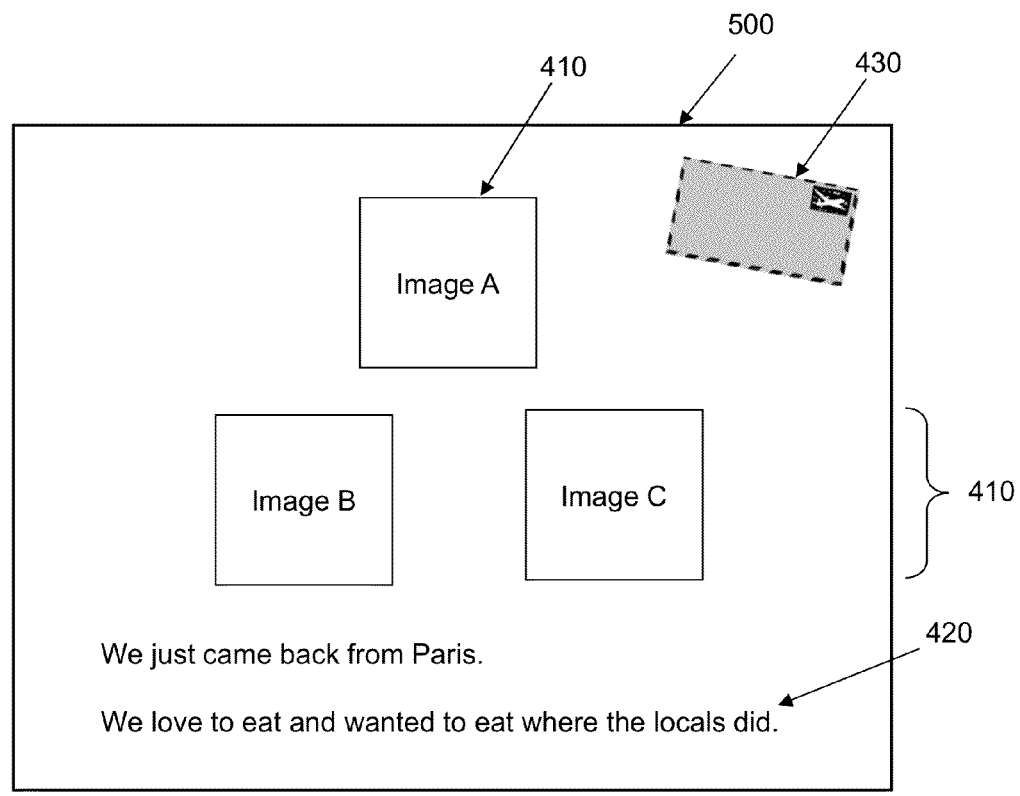
FIGS. 5A and 5B show exemplified photobook pages based on the content in the blog page in FIGS. 4A and 4B.
Figure 5B:
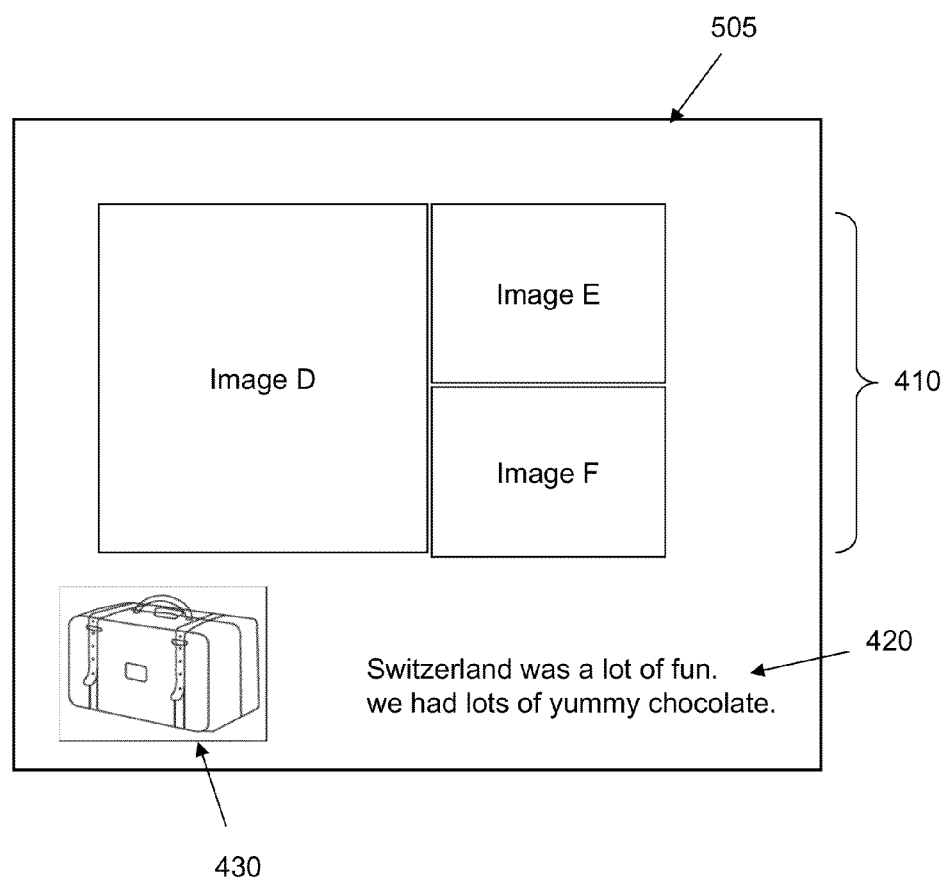

A photobook design is initiated for a user (step 340, FIG. 3). The initiation can be by a user, or automatically by the photobook engine 164. The user can be the same as the owner of the blog pages 400, 405. Alternatively, the user responsible for the creation of the photobook design can be different from the owner of the blog pages 400, 405. As shown in FIGS. 5A and 5B, a photo book design includes pages 500, 505 pages each including one or more images, text, and design objects. The photobook engine 164 can create at least a portion of a photobook design using the content from one or more blog pages 400, 405. In some embodiments, the photobook engine 164 identifies blog pages having content typically provided by the same user. The photobook engine 164 automatically incorporates the images 410, the text 420, the design objects 430, and optionally comments 440 on the blog pages 400, 405 into pages 500, 505 in the design of a photobook (step 370, FIG. 3). The photobook engine 164 can shorten the text 420 and incorporate an abbreviated version of text in the design of the photobook.

The user often has a large number of blog pages each covering a different event. Each blog page can include a plurality of images. Each image can also include multiple, and sometimes a large number of, comments.

In some embodiments, the blog pages 400, 405, the images 410, the text 420, the design objects 430, and optionally comments 440 on the blog pages 400, 405 are selected according to the views 450 (or visits and click-throughs) (step 350, FIG. 3). For example, the blog pages or images that received more visits (i.e. more popular) can be selected to be incorporated into photobooks over the ones that received fewer visits (less popular) (step 370, FIG. 3). This step can save the user from spending time on trimming out a large amount of blog content if they are all incorporated into a photobook design.

In some embodiments, the blog pages 400, 405, the images 410, the text 420, the design objects 430, and optionally comments 440 on the blog pages 400, 405 are selected according to the votes (or likings, or favorites) by the viewers (step 360, FIG. 3). For example, the blog pages that received more votes (i.e. more popular) can be selected to be incorporated into photobooks over the ones that received fewer votes (less popular) (step 370, FIG. 3).

Figure 4A:
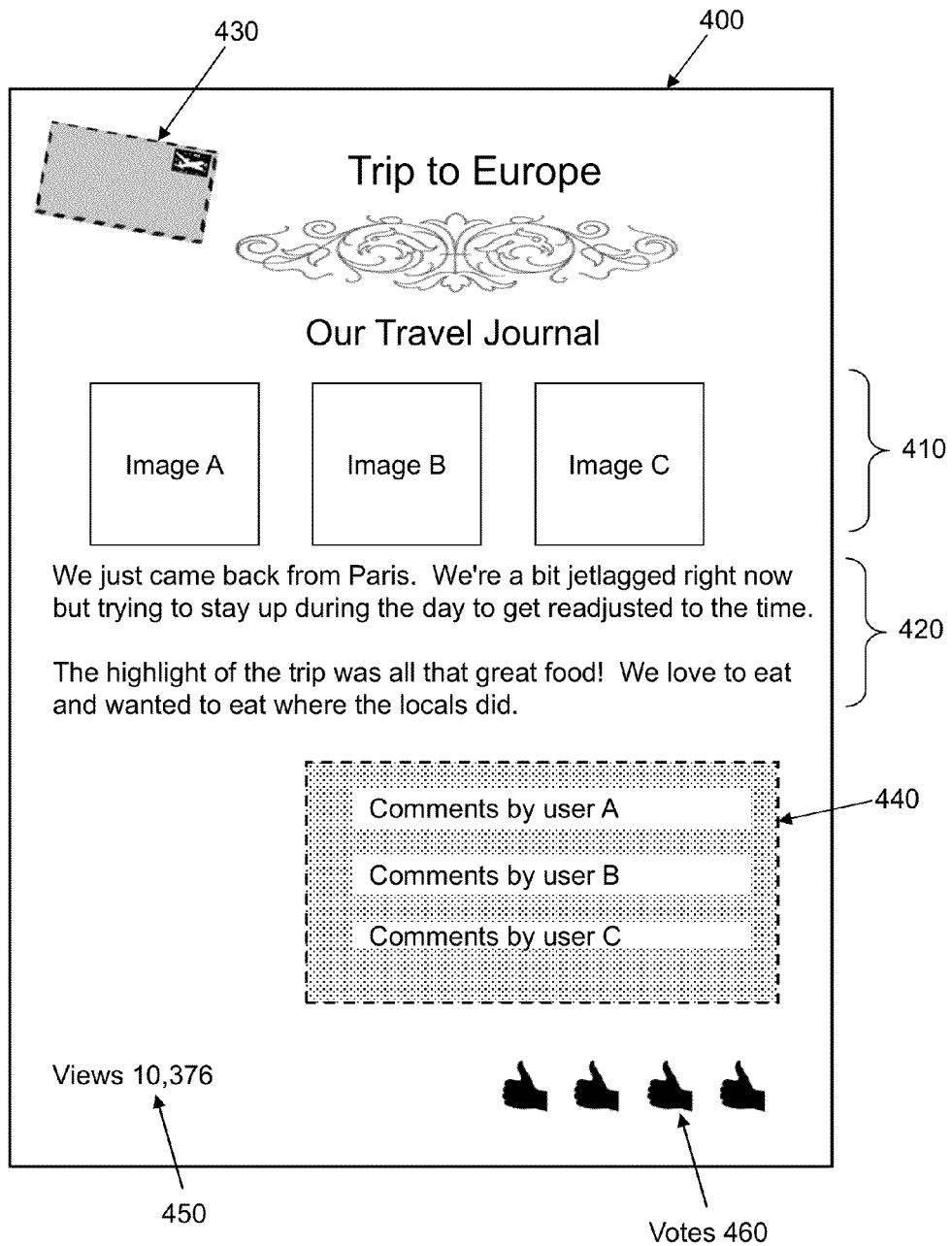
FIGS. 4A and 4B illustrate exemplified blog pages containing images, text, and design objects.
Figure 4B:
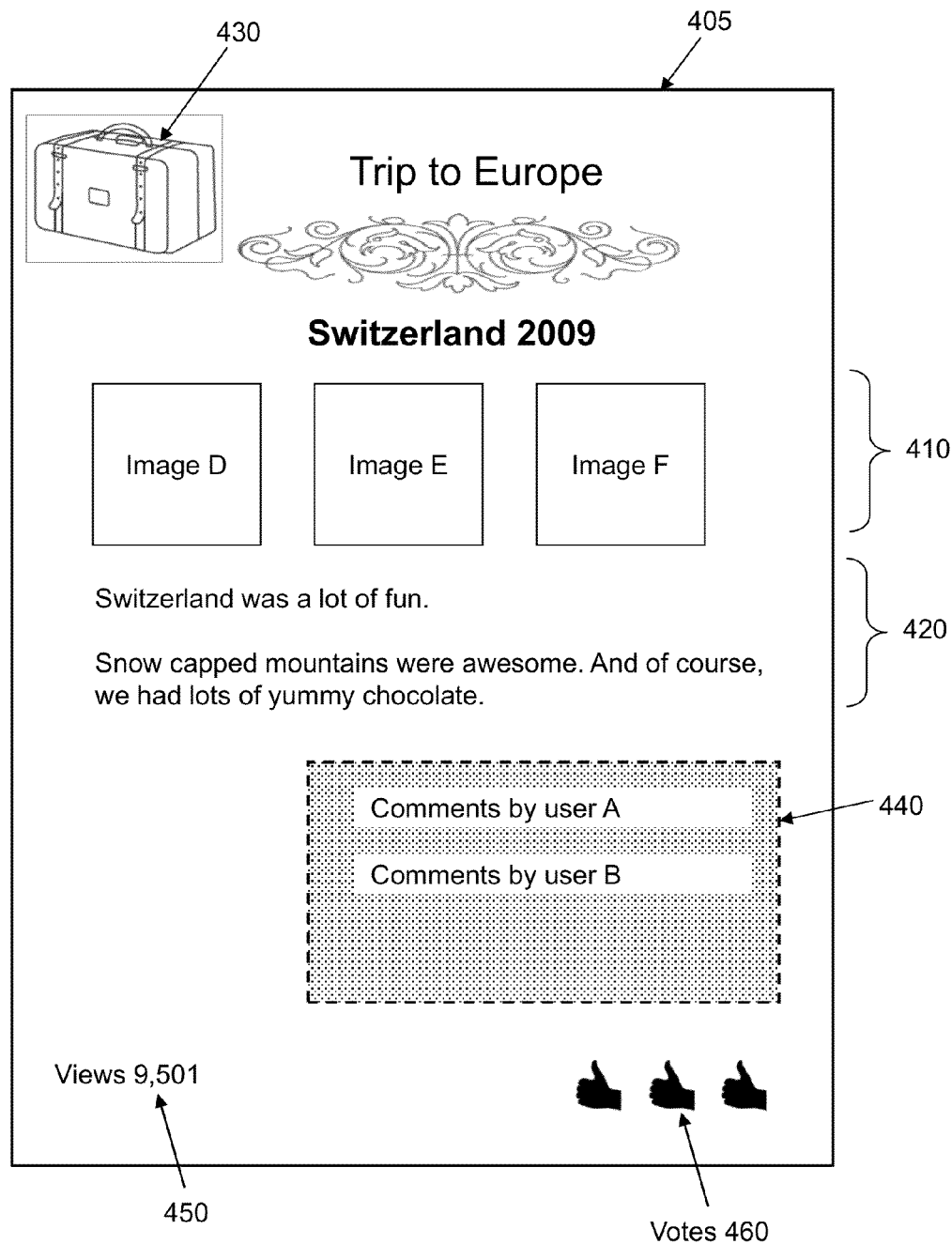
Figure 6A:
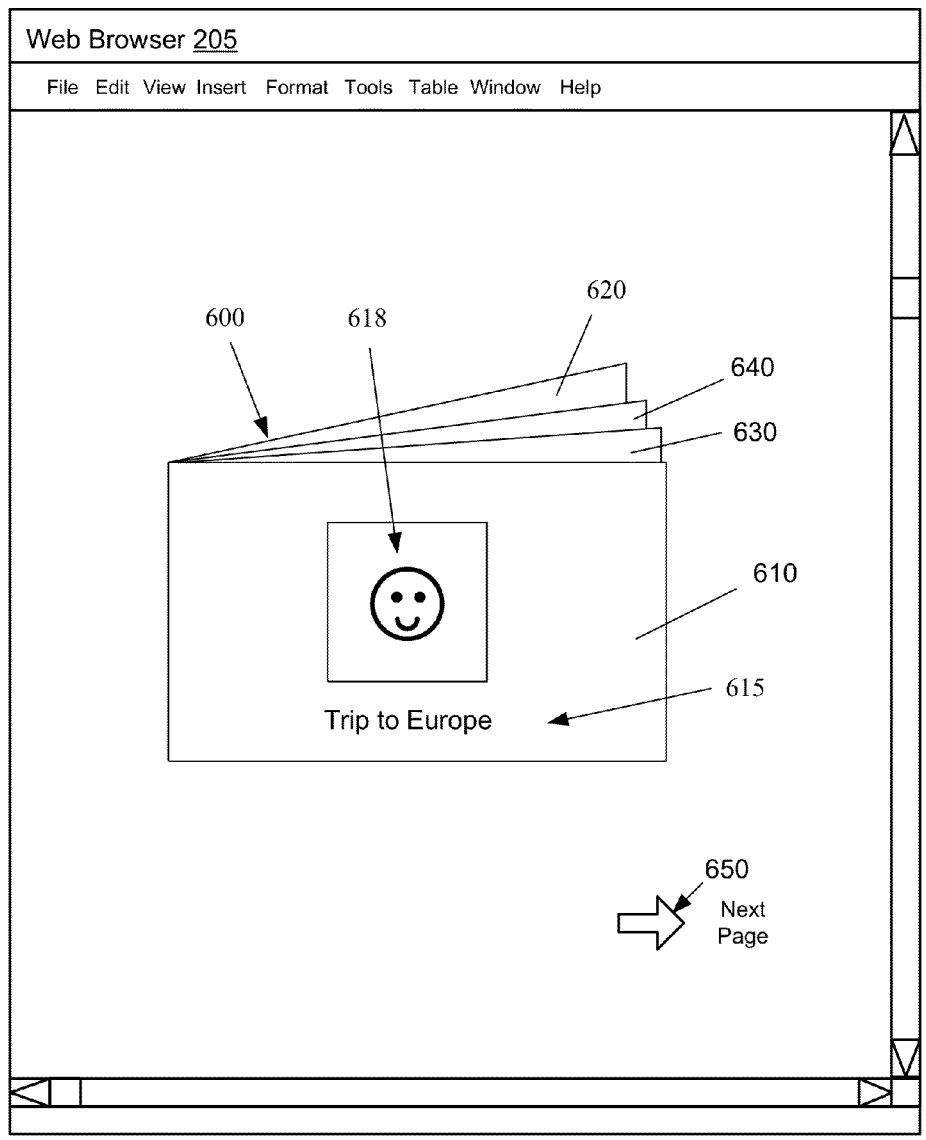
FIGS. 6A and 6B illustrate an exemplified photobook design created in accordance to the present invention.
Figure 6B:
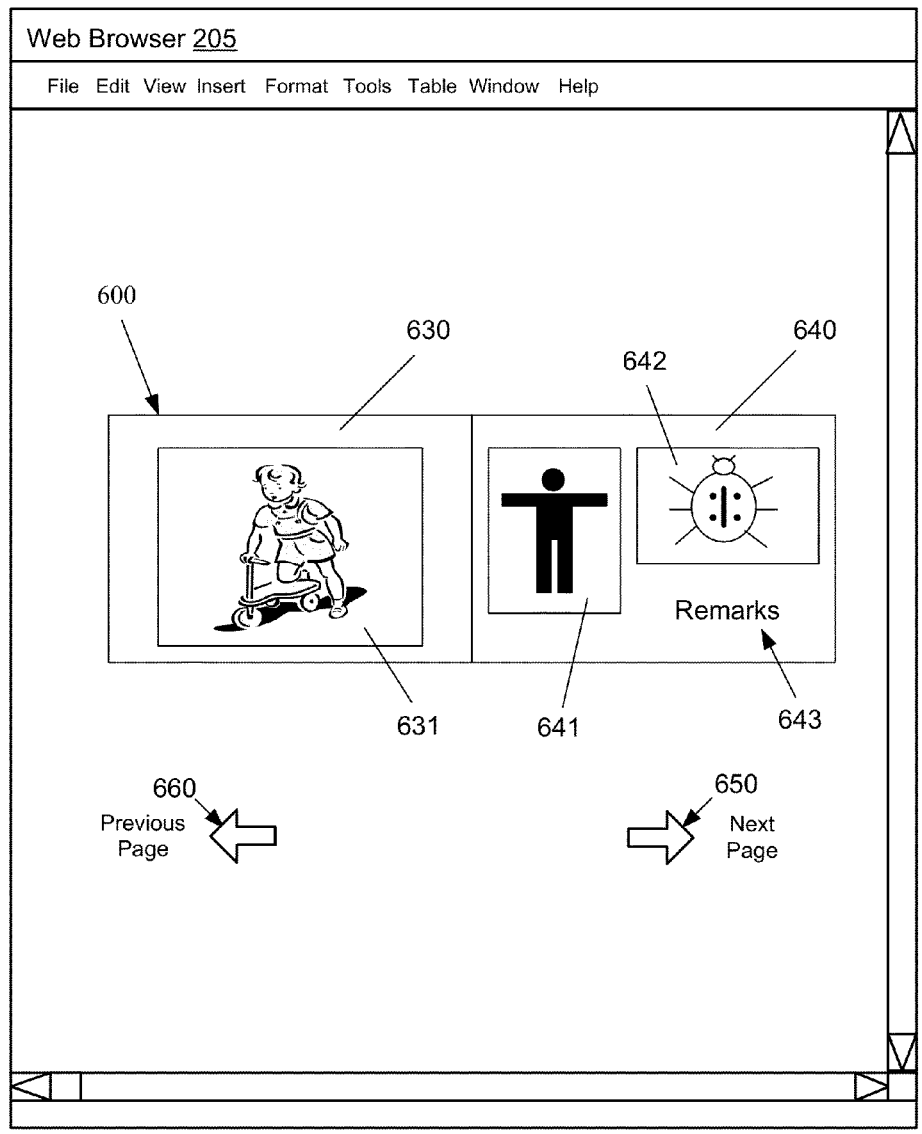

Referring to FIGS. 3, 6A, 6B, a photobook design 600 is viewable by the user in a web browser 205 on the computer device 100 (FIG. 1) during or after the completion of the photobook design 600 (step 380, FIG. 3). The photobook design 600 can include a front cover 610, a back cover 620, and a plurality of pages 630, 640. The book title can be automatically selected from the name of the image album 320. The front cover 610 can include a book title 615 and an image 618 selected from the images 410 (FIGS. 4A, 4B). The presentation of the photobook design 600 can include realistic illumination and texture to imitate effects of the materials in the selected book format. The user can click arrow buttons 650, 660 to view different pages of the photobook. The cover and different pages of the photobook design 600 can also be played automatically like a slide show. The user is allowed to edit the photobook design 600. The user can change, switch, or remove the images 618, 631, 641, and 642 on the book cover 610 and pages 630, 640. The user can also edit text and image on the pages (step 380, FIG. 3). After the user has reviewed and optionally edited the photobook design 600, the user can approve and save the photobook design 600. A physical photobook can be made according to the photobook design 600 at a printing finishing facility 170 (FIGS. 1 and 2).

It should be noted that the photobook engine 164 can automatically select page layout according to the type of content on the blog pages. For example, the number, the image sizes, and image formats (landscape and portrait) of images, the size of the text boxes, and the location and the dimensions of the design objects in a page layout can be tailored to match the corresponding properties of the images 410, the text 420, the design objects 430, and optionally comments 440 on the blog pages 400, 405 (FIGS. 4A, 4B). For example, an image 410 in landscape format and certain size will be reproduced on the page layout in landscape format and an appropriate size. A large text area is reserved for a longer text, etc.

The user has the freedom to edit and change the page layout, or select a different page layout (step 380, FIG. 3). Specifically, the images on the pages 500, 505 of the photobook design 600 can be selected to be consistent with the sizes of the images 410 on the blog pages 400, 405.

Figure 7:
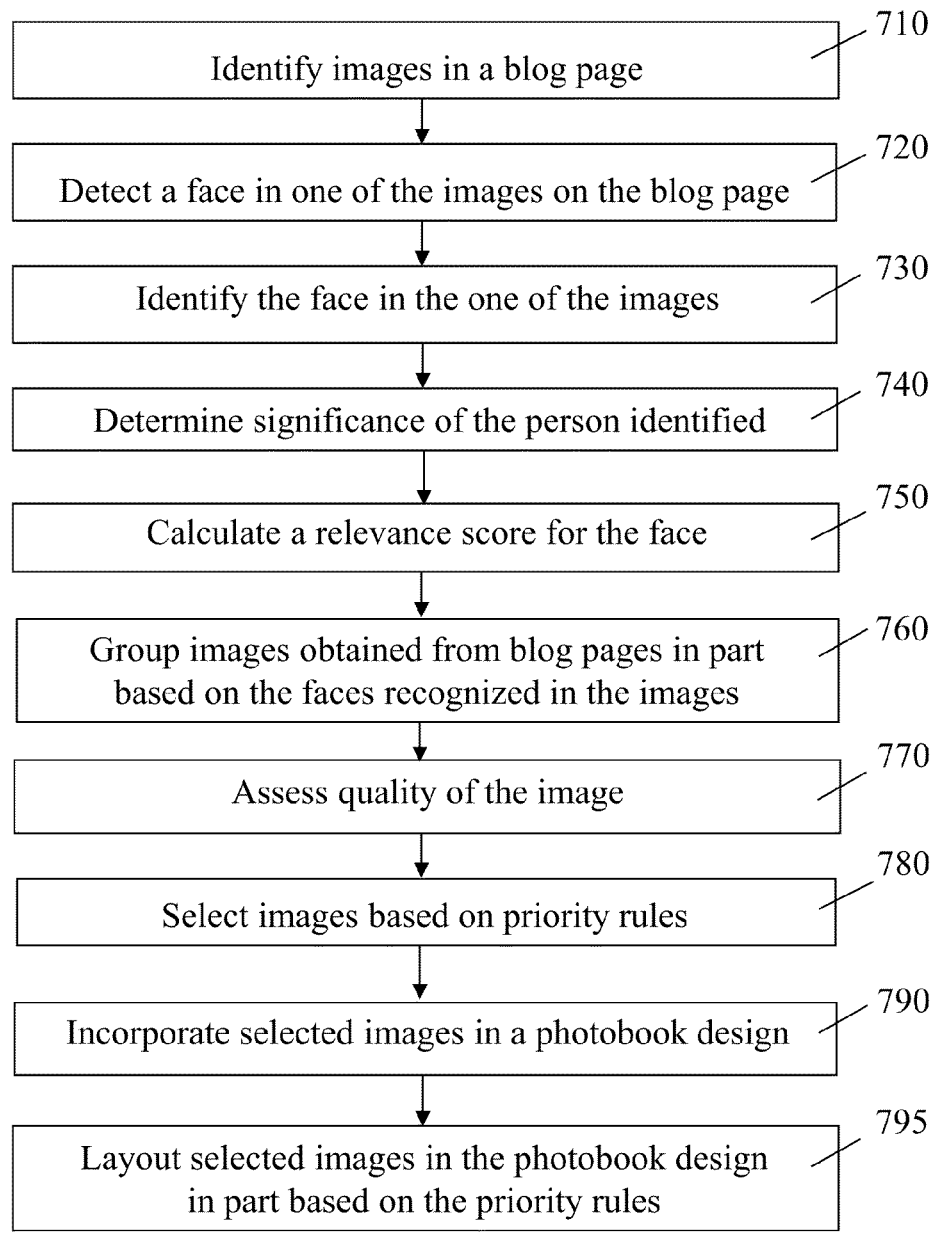
FIG. 7 shows another flow chart for selecting most relevant and desirable images from blog pages to create a photobook design in accordance to the present invention.

In some embodiments, referring to FIGS. 4A-4B and 7, a method is disclosed to select most relevant and desirable images 410 from blog pages 405 to create a photobook design. Images are identified in blog pages (step 710).

Figure 8:
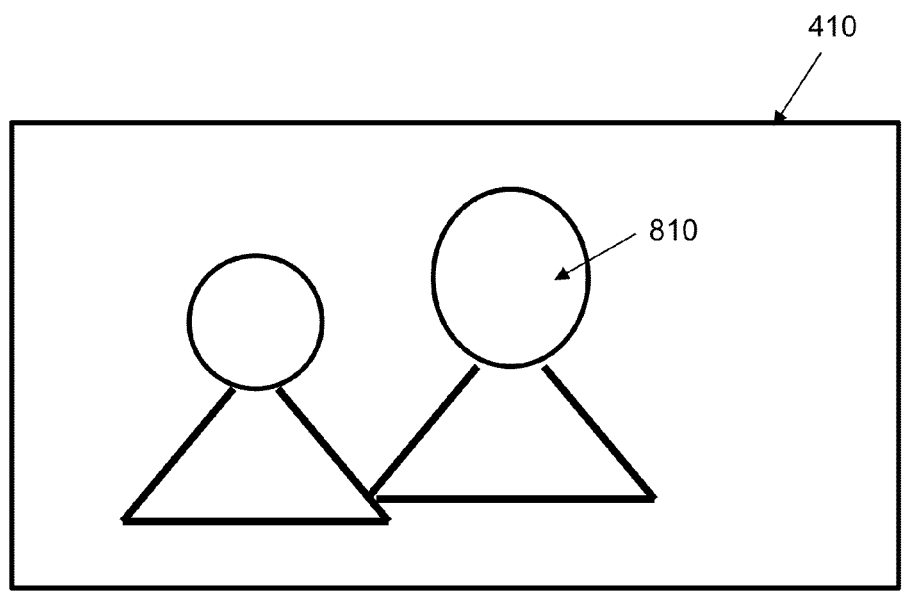
FIG. 8 illustrates selecting image from blog page based on face recognized.

Referring to FIGS. 2, 7, and 8, the selection of images from blog pages are based on a set of priority rules 166. The priority rules 166 can be based on the views, votes, likes, and visits received by the images, and related content received by the blog pages at the sharesite, as described above. The priority rules 166 can also be based on faces detected in the images. A face 810 is detected in the image 410 on the blog page by the intelligent analysis module 168 (step 720). The face is identified as a person (step 730). The face recognition can include one or more of the following steps. The face in the image 410 can be compared to face models of known persons already stored in or in association with the photobook engine 164. The face models (which can be stored in the intelligence data 169) are typically specific to a user or a user's family. A matching between the face in the image and pre-stored face models can be determined by a number of factors such as location, exposure, size, clarity, orientation, and facial expression such as smile of the face 810. Once a matching is found, the face is identified to be the person related to the face model. Details of face recognition and identification are disclosed in commonly assigned U.S. patent application Ser. No. 13/525,037, tilted "Assisted photo-tagging with facial recognition models", filed Jun. 12, 2012, by Johnson, et al., the disclosure of which is incorporated herein by reference.

Once a face is identified, the significance of the person associated with the face is determined (step 740). A significant person can be already labeled in association with the pre-stored face models. The significance of an identified person can also be learned and inferred from the frequency of appearances of the person on blog pages. A relevance score is calculated for the face identified based on predetermined criteria (step 750), which can include the significance of the person identified, the properties of the face image (location, exposure, size, clarity, and orientation, etc. within the image), and facial expression, etc. Higher priority is given to faces with high significance and more prominent appearance within the images. The images on the blog pages can be grouped in part based on the faces identified in the images (step 760).

The priority rules 166 can also be based on image quality of the images 410 on the blog pages 405. The qualities of the images 410 are assessed by the intelligent analysis module 168 (step 770) based on a number of factors such as blur detected (sharpness) in the image, contrast and lightness, intensity balance, vibrancy of colors, and scenes detected, etc. The intelligent analysis module 168 can also analyze and obtain photo-capture times and locations of the images 410 on the blog pages 405. The properties of the images 410 can also be stored in the intelligence data 169.

Finally, the images 410 on the blog pages 405 are automatically selected by the intelligent analysis module 168 based on the set of priority rules 166 including image qualities, scores of the faces identified in the images, image capture times and locations, etc. (step 780). The priority rules are aimed at selecting images most relevant and desirable to the user. The selected images are incorporated into a photobook design (step 790) by the photobook engine 164 as shown in FIGS. 5A-6B.

The selected images are laid out in the photobook design by the photobook engine 164 in part based on the priority rules (step 795). Images selected from the blog pages having higher priority can be placed in higher visibility location and areas (large or more prominent) on a book page. The photo book cover, given its significance, typically receives an image having high priority. Images having same identified persons, or same identified scenes or colors can be placed adjacent to each other on a photobook design. Images can also be sequenced and clustered by their respective capture times and laid out on book pages accordingly. Details of face recognition and identification are disclosed in commonly assigned U.S. patent application Ser. No. 13/520,325, tilted "System and method for creating a collection of images", filed Jul. 2, 2012, by Bercovich, et al., the disclosure of which is incorporated herein by reference.

It should be understood that the presently disclosed systems and methods are suitable for creating image products other than photobooks. The image products can include multiple pages or views that each can display one or more images, such as photo books, photo calendars, photo scrapbooks, photo snapbooks, photo calendars, photobooks, and a multi-face photo card. The image products can also include a single page or view for displaying one or more images, which can include, for example, photo greeting cards, holiday cards, stationery cards, photo mugs, photo T-shirts, photo aprons, single photo pages, photo collage pages, a photo stationery, photo banners, photo mugs, photo mouse pads, photo keychains, photo collectors, and photo coasters etc.

Furthermore, it should be understood that the design of the image products can incorporate other type of content on blog pages that are not mentioned above. Additionally, with proper permission, content from the blog pages of different users can also be incorporated into a user's photobook design. Moreover, the publication of the bog pages and the design of the image products may be conducted at different websites.

What is claimed is:

1. A method for creating a design for an image product, comprising:
    identifying, by a computer system, one or more blog pages, and images, text, or design objects on the one or more blog pages at a web site;
    obtaining, by the computer system, numbers of views or votes received by the one or more blog pages, or on the one or more blog pages, the images, the text, or the design objects;
    automatically selecting, by the computer system, one of the blog pages, or at least one of the images, text, or the design objects on the one or more blog pages based on the number of views or votes;
    automatically incorporating, by the computer system, at least one of the image, text, or a design object on the blog page into a layout of the image product to create a design of the image product; and
    allowing a user to review the design of the image product created by the computer system, wherein the computer system is configured to communicate with a printing finishing facility at which a physical image product is to be made according to the design of the image product.

2. The method of claim 1, further comprising:
    enabling the user to publish the one or more blog pages by the computer system; and
    tracking the numbers of views received by the one or more blog pages by the computer system.

3. The method of claim 1, further comprising:
    enabling the user to publish the one or more blog pages by the computer system; and
    tracking the numbers of votes on the one or more blog pages by the computer system.

4. The method of claim 1, wherein the step of automatically incorporating comprises:
    determining the image formats of the image by the computer system;
    automatically selecting a page layout according to the image format of the image; and
    automatically incorporating the image into the page layout which forms a portion of the design of the image product.

5. The method of claim 1, wherein the step of automatically incorporating comprises:
    determining the image size of the image by the computer system;
    automatically selecting a page layout according to the image size of the image; and
    automatically incorporating the image into the page layout which forms a portion of the design of the image product.

6. The method of claim 1, further comprising:
    automatically selecting a layout based on the image, text, or a design object on the one or more blog pages identified by the computer system.

7. The method of claim 1, wherein the image product comprises a photobook, a photo greeting card, or photo stationery.

8. The method of claim 1, wherein the one or more blog pages are posted by the user.

9. The method of claim 1, further comprising:
    receiving an order from the user for a physical image product; and
    making the physical image product according to the design of the image product at the printing finishing facility.

10. The method of claim 1, wherein at least one of the image, text, or the design object in the blog page is transferred to the computer system via a computer network, wherein the computer system comprises one or more servers.

11. A method for creating a design for an image product, comprising:
    identifying, by a computer system, images on one or more blog pages at a web site;
    automatically selecting one or more of the images on the one or more blog pages by the computer system based on a set of priority rules, wherein the set of priority rules are based on numbers of views or votes received by the one or more blog pages or the images, faces identified in the images, or qualities of the images;

automatically incorporating, by the computer system, the selected one or more images into a layout of the image product to create a design of the image product; and allowing a user to review the design of the image product created by the computer system, wherein the computer system is configured to communicate with a printing finishing facility at which a physical image product is to be made according to the design of the image product.

12. The method of claim 11, further comprising:

enabling the user to publish the one or more blog pages by the computer system; and tracking the numbers of views or votes received by the one or more blog pages or the images on the one or more blog pages by the computer system.

13. The method of claim 11, further comprising:

identifying a face in one of the images to be a person on the one or more blog pages; and calculating a relevance score for the identified face in the one of the images, wherein the priority rules are in part based on the relevance score.

14. The method of claim 13, wherein the face in one of the images is identified to be a person by comparing and matching the face to a plurality of face models, wherein each of the face models is associated with a known person.

15. The method of claim 11, wherein the relevance score is in part determined by significance of the person identified with the face.

16. The method of claim 11, wherein the relevance score is in part determined by location, exposure, size, clarity, or orientation of the face in the one of the images on the blog pages.

17. The method of claim 11, further comprising:

calculating qualities of the images, wherein the priority rules are in part based on the qualities of the images.

18. The method of claim 17, wherein the qualities of the images include one or more of blur detected in the one or more images, contrast and lightness, intensity balance, vibrancy of colors, and scenes detected in the one or more images.

19. The method of claim 11, further comprising:

incorporating the selected one or more images into a layout of the image product in part based on the set of priority rules.

20. The method of claim 11, wherein the image product comprises a photobook, a photo greeting card, or photo stationery.

* * * * *